FIG. 4
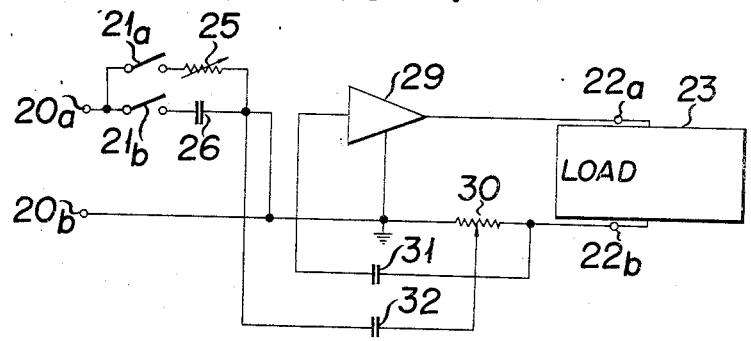
FIG. 5a
FIG. 5b
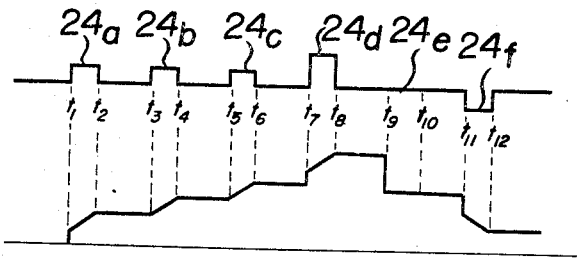

United States Patent Office 3,490,691
Patented Jan. 20, 1970

3,490,691
PROPORTIONAL AND INTEGRAL ACTION CONTROLLER FOR SAMPLED DATA CONTROL SYSTEM
Tatsuya Uyetani, Kanagawa-ken, and Keisuke Takada, Tokyo, Japan, assignors to Tokyo Shibaura Electric Co., Ltd., Kawasaki-shi, Japan, a corporation of Japan
Filed May 29, 1967, Ser. No. 642,059
Claims priority, application Japan, June 2, 1966, 41/35,093
Int. Cl. G06g 7/18
U.S. Cl. 235—183　　　　　　　　　　　　3 Claims

ABSTRACT OF THE DISCLOSURE

A proportional and integral action controller for a sampled data control system comprises a memory device adapted to store the output from an operational amplifier during sampling of the input signal and to supply said stored output to said operational amplifier during holding period and to feed back said stored output to the output from said operational amplifier during said holding period and to feed back said stored output to the input side of said operational amplifier during sampling period.

---

This invention relates to a proportional and integral action controller (for brevity it will hereinafter be designated simply as the PI controller).

In some controlled systems, processes and the like, there are large dead times and time constants may be large so that the result of varying the operational quantity or manipulated quantity appears with a substantial time lag. Consequently, quick variations of the controlled variable, appearing in the operational quantity, not only results in unsatisfactory results, but also overshooting, thus causing instability of the system. Therefore, better control functions can be expected when the controlled variable is detected and utilized for effecting the control only after elapse of a certain time interval subsequent to variation of the operational quantity at which the effect of said variation begins to appear. For this reason, sampled data control has been applied to systems involving dead time.

Where a conventional continuous type PI controller is used in the sampled data control it is necessary to provide an independent sampler and a holder. However, provision of such independent elements results in more complicated construction of the system than the continuous control system and hence increases the manufacturing cost of the control system.

It is therefore an object of this invention to provide a simple and inexpensive proportional and integral action controller for a sampled data control system.

According to this invention this object can be attained by arranging the controller which performs PI action during the sampling period such that it is used as the holder during holding period.

Briefly stated the proportional and integral controller for controlling sampled data comprises means including an operational amplifier to produce proportional and integrated outputs of input signals, a sampling device to open and close the input side of said operational amplifier at a predetermined frequency, a memory device adapted to store the outputs from said operational amplifier at the time of sampling said output signals and to supply said stored outputs to said operational amplifier during the holding period, and feedback means to store the outputs from said operational amplifier during said holding period and to feed back said stored outputs to the input of said operational amplifier during sampling.

This invention can be more fully understood from the following detailed description taken in connection with the accompanying drawings, in which:

FIGS. 3 and 4 show circuit connections of the controller shown in FIG. 2 during sampling and holding periods, respectively; and FIGS. 5a and 5b are waveforms to explain the operation of the controller embodying this invention.

Figure 1:
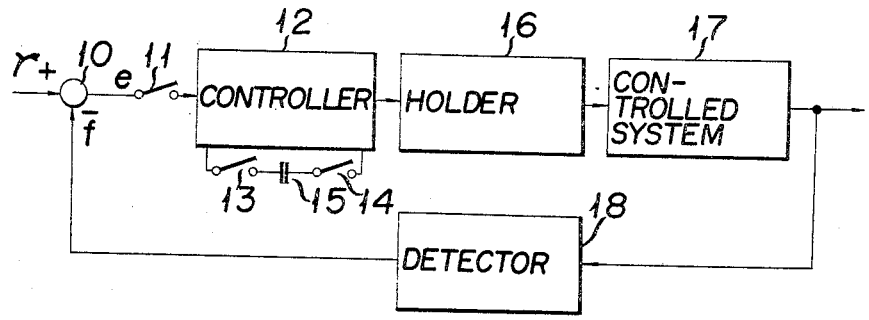
FIG. 1 shows a block diagram illustrating one example of the application of a conventional controller to sampled data control.

An example of the application of a conventional continuous type PI action controller to a sampled data control is illustrated in FIG. 1 of the accompanying drawings. A deviation value $e$ obtained by comparing a setting value $r$ and a feedback value $f$ in a comparator 10 is supplied to a controller 12 through a sampler 11. The controller 12 includes an input storing condenser 15 connected between a pair of serially connected contacts 13 and 14 which are operated in synchronism with the sampler 11. The output from the controller 12 is applied to the controlled system 17 involving dead time through a holder 16 which operates to hold said output for an interval during which the sampler 11 is held open. A detector 18 is provided to detect the controlled variable to provide a feedback signal $f$.

The sampler 11 includes a contact which is closed for a certain period $\Delta T$ at a definite interval $T$, and when said contact is closed a signal $e$ representing the deviation between the setting value $r$ and the feedback value $f$ is applied to the controller 12 thus performing PI operation in the controller 12. The result of the operation is imparted to the holder 16. Upon opening the contact of the sampler the output from the PI action controller becomes zero or unstable because its input is interrupted. However, as the holder 16 stores and preserves the resultant signal of the operation during this interval, the control signal is continuously supplied to the controlled system. The memory condenser 15 operates to store the deviation signal $e$ supplied from the controller 12 when contacts 13 and 14 are opened in synchronism with the sampler 11. The memory condenser 15 further operates to provide to the controller 12 an input signal proportional to the difference between the previous deviation and a new deviation which is supplied when the contact of the sampler 11 is reclosed.

Such a sampled data control system is different from a continuous control system in that it includes a sampler and a holder. The holder may comprise an electrical circuit or an electromagnetic valve or the like when the operating end is driven by compressed air. Provision of an independent holder in addition to the controller increases the cost of the system when compared with the continuous control system.

As mentioned hereinabove, according to this invention the holder required in the conventional sampled data control system can be eliminated by utilizing the controller as the holder during the holding period which is provided to perform PI operation during the sampling period.

Figure 2:
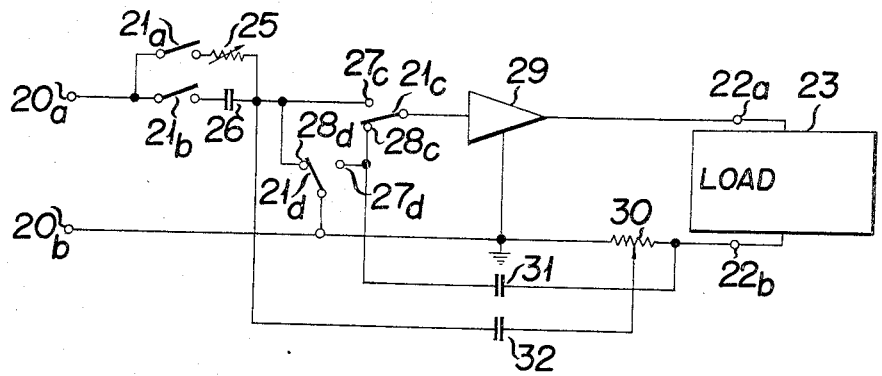
FIG. 2 shows a block diagram of one embodiment of the proportional and integral controller embodying this invention for controlling sampled data.

Referring now to FIG. 2 of the accompanying drawings which shows a connection diagram of one embodiment of a proportional and integral controller for controlling sampled data, deviation signals from a comparator, not shown, are supplied across terminals 20a and 20b, the terminal 20b being grounded as shown. A switch 21a responsive to a sampler has its first terminal connected to the input and its second terminal to a variable resistor 25 which in turn has another end connected to terminal 27c of a switch 21c which is also responsive to a sampler. Connected similarly between input 20a and terminal 27c is a circuit of a switch 21b responsive to a sampler and an integrating condenser 26. The switch 21c has terminals 27c and 28c and a common terminal connected to an input of an operational amplifier 29. The output from the operational amplifier or the PI action controller is supplied to a load 23 through output terminals 22a and 22b. Between the terminal 22b and the ground is connected a feedback resistor 30 which is arranged in series with the load 23. The sampler contact 21c is shown as a switching contact device including two stationary contacts, a feedback condenser 32 being connected between one of the contacts 27c and the sliding arm of said feedback resistor 30. Further a holding condenser 31 is connected between the stationary contact 28c which is closed when said contact device 21c is held and one of the output terminals 22b. An additional switching contact device 21d is provided to respond to the sampler connected to the input terminal 20b. The stationary contact 28d of the contact device 21d which is closed when it is held is connected to the contact 27c of the first contact device 21c while the other stationary contact 27d which is closed at the time of sampling is connected to the contact 28c of said first contact device 21c. It is to be understood that all said contacts 21a, 21b, 21c and 21d are arranged to operate or switch in synchronism with the operation of the sampler, that contacts 21a and 21b are arranged to be closed at the time of sampling but opened during holding and that contacts 21c and 21d are arranged to be contacted with the stationary contacts 27c and 27d, respectively, at the time of sampling but contacted with the stationary contacts 28c and 28d, respectively, at the time of holding.

The operation of the controller shown in FIG. 2 is as follows: During sampling, contacts 21a and 21b are closed and contacts 21c and 21d are switched to contacts 27c and 27d, respectively. Accordingly, the circuit under this state can be shown by FIG. 3 wherein the same components as in FIG. 2 are designated by the same reference numerals. The controller performs the PI operation for the deviation input to provide an output current. The transfer function $G(s)$ is represented by the following equation:

$$G(s) = \frac{C_I}{\alpha C_F}\left(1 + \frac{1}{SC_I R_I}\right)$$

where $C_I$ and $C_F$ represent capacitances of condensers 26 and 32, respectively, $R_I$ the value of the resistor 25, $\alpha$ the controller proportional-band pot ratio of the feedback resistor 30, and S the Laplacian. Consequently, the ratio $C_I/\alpha C_F$ represents the proportional gain and $C_I \cdot R_I$ the integrating time. Thus, this circuit provides PI operation outputs like an ordinary controller. At this time the holding condenser 31 will be charged by a voltage drop across the feedback resistor 30 to store the voltage corresponding to the final value of the output current.

Upon commencement of the holding period subsequent to the sampling period contacts 21a and 21b will be opened while the contacts 21c and 21d are switched to terminals 28c and 28d, respectively. The circuit under these conditions is indicated by FIG. 4, similar elements being again designated by the same reference numerals as in FIG. 2. As can be clearly noted from FIG. 4, the terminal of the holding condenser 31 which was grounded during sampling is connected to the input of the operational amplifier 29. Since the holding condenser 31 is storing the voltage corresponding to the final output provided at the time of sampling the operational amplifier 29 will continue to provide the same output as the final output during sampling thus effecting a holding operation. At this time since the junction between the integrating condenser 26 and the feedback condenser 32 is connected to the ground through contact 21d like the holding condenser 31 during sampling, the feedback condenser 32 will be charged by a voltage corresponding to the output during holding, acting as a memory device and storing the output during holding. Further as the integrating condenser 26 is opened by the contact 21b it will act as the memory condenser to store the final input error or deviation signal during sampling.

Figure 3:
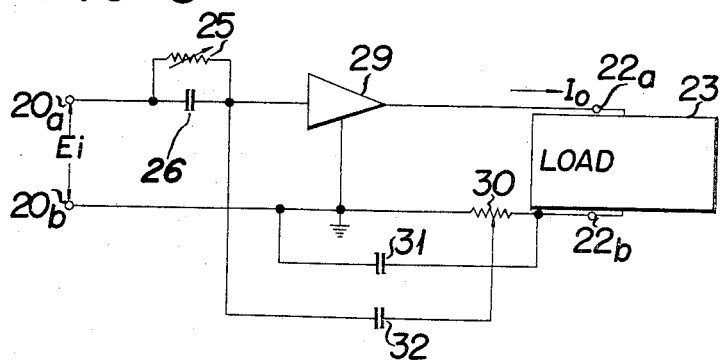

Thus, during the next sampling period subsequent to the holding period, the circuit resumes the state shown in FIG. 3 thus repeating the above described PI operation. Thus, if the new deviation signal were the same as the final value during the previous sampling period the voltages that have been stored in the integrating and feedback condensers 26 and 32 would not be varied rapidly so that the output would provide only the integrating operation of the output value at the time of holding without causing any turbulence. Where the new deviation is different from the final value during previous sampling period a proportional operation will be performed with regard to the difference between the new deviation and the previous deviation stored in the integrating condenser 26 while at the same time to perform integration operation for the new deviation. Thereafter the same operation is repeated.

FIG. 5 shows waveforms to illustrate one example of the relation between the input and output of the controller embodying this invention, where FIG. 5a shows the sampling deviation input and FIG. 5b the output. With respect to the first deviation input 24a, the PI operation for the deviation component will be made because no deviation is stored in the integrating condenser 26, and its final value is maintained during holding period. If the second sampling deviation input 24b were the same as the first sampling deviation input only the I operation will be made. The same operation will be made for the third sampling deviation input 24c. As the fourth sampling deviation input 24d is larger than the previous input 24c, the P operation for the difference therebetween will be made, and will be followed by the I operation. When the fifth input 24e is zero the P operation will be made for the difference between it and the previous input. When the sixth input 24f is negative the output of the controller will be reduced by the difference between the sixth input and the previous input by the P operation followed by the I operation. More particularly, with the waveform of FIGS. 5a and 5b the circuit of FIGS. 3 and 4 operates as follows.

At $t_1$, the condenser 26 is not charged. When the input 24a is applied, the condenser 26 will be immediately charged up to the magnitude of the input 24c since the series resistance of the condenser 26 nearly equals zero. Consequently, the output waveform abruptly rises up, and thereafter the integrating operation is executed by the condensers 25 and 32; $t_2$–$t_3$ represents a holding period. When the input 24b is applied at $t_3$, current does not flow into the condenser 26 since the condenser 26 has been already charged, and therefore there is no abrupt rise up of the output. The output gradually rises by proportional operation. The same action applies also in case of the input 24c.

At $t_7$, the voltage of the input 24d is higher than that of the input 24c, and current flows into the condenser 26 as much as its higher portion so that the condenser 26 is charged, causing the output to rise up as much as that portion according to proportional operation.

At $t_9$, the condenser 26 is discharged. The PI operations at $t_{10}$, $t_{11}$, $t_{12}$ and so on are similarly carried out in turn.

As can be understood from the foregoing description, notwithstanding simple construction, the controller embodying this invention can perform not only the PI action but also the holding operation so that the separate holding element required for a conventional sampled data controller can be eliminated, thus greatly simplifying the sampled data control system and reducing its cost.

It is to be understood that many alterations and modifications may be made without departing from the true spirit and scope of the invention. For example, contacts 21a, 21b, 21c, 21d may be replaced by contactless switching elements such as transistors and the like.

What is claimed is:

1. Proportional and integral controller for a sampled data control system comprising:
    a signal input terminal (20a);
    an operational amplifier (29);
    an integrating condenser (26);
    a feedback condenser (32) coupled to an output of said operational amplifier (29);
    a resistor (25), one terminal of which is coupled to a terminal of said integrating condenser (26);
    a holding condenser (31) coupled to an output of said operational amplifier (29); and
    switching means responsive to a sampler to connect, during the sampling period, said integrating condenser (26) and said resistor (25) in parallel relationship between said signal input terminal (20a) and an input terminal of said operational amplifier (29), to connect said feedback condenser (32) between the output and input of said operational amplifier (29) and to connect said holding condenser (31) between the output of said operational amplifier and a reference level to produce proportional and integrated outputs of input signals and to store the signal corresponding to the output of said operational amplifier (29) in said holding condenser (31) at the time of sampling of said input signals; said switching means, during the holding period, connecting said feedback condenser (32) between the output of said operational amplifier (29) and said reference level to store an output of said operational amplifier, and further connecting said holding condenser (31) between the output and the input of said operational amplifier (29) to supply a signal stored in said holding condenser (31) to the input of said operational amplifier (29) during the holding period.

2. A controller according to claim 1 wherein said switching means includes first, second and third switches;
    the first switch having a first terminal coupled to the signal input terminal and a second terminal coupled to the junction point of the integrating condenser (26), resistor (25) and feedback condenser (32);
    the second switch having a first terminal coupled to said junction point, a second terminal coupled to one terminal of said holding condenser (31) and a third terminal coupled to the input of said operational amplifier (29); and
    the third switch having a first terminal coupled to said junction point, a second terminal coupled to said holding condenser (21) and a third terminal coupled to said reference level.

3. A controller according to claim 1 wherein said operational amplifier is coupled to an output circuit comprising a load (23) coupled in series with a resistor (30), the output of the operational amplifier being taken across the resistor.

References Cited

UNITED STATES PATENTS

| 3,243,585 | 3/-966 | Escobosa | 235—184 |
| 3,374,362 | 3/1968 | Miller | 235—183 X |

OTHER REFERENCES

Korn and Korn: Electronic analog computers, McGraw-Hill Book Company 1956 (second edition) (pp. 22 and 415).

MALCOLM A. MORRISON, Primary Examiner

FELIX D. GRUBER, Assistant Examiner

U.S. Cl. X.R.

235—151.1; 318—18; 328—127, 151